United States Patent
Jiang

(10) Patent No.: US 12,557,123 B2
(45) Date of Patent: Feb. 17, 2026

(54) BEAM DETERMINATION METHOD AND APPARATUS, AND COMMUNICATION DEVICE AND COMPUTER STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 293 days.

(21) Appl. No.: 18/260,256

(22) PCT Filed: Jan. 5, 2021

(86) PCT No.: PCT/CN2021/070334
§ 371 (c)(1),
(2) Date: Jul. 3, 2023

(87) PCT Pub. No.: WO2022/147656
PCT Pub. Date: Jul. 14, 2022

(65) Prior Publication Data
US 2024/0057128 A1 Feb. 15, 2024

(51) Int. Cl.
*H04W 72/30* (2023.01)
*H04W 72/044* (2023.01)
*H04W 72/23* (2023.01)
*H04W 72/542* (2023.01)

(52) U.S. Cl.
CPC ......... *H04W 72/30* (2023.01); *H04W 72/046* (2013.01); *H04W 72/23* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 2019/0260620 A1* | 8/2019 | Gong | H04B 7/0617 |
| 2019/0349915 A1* | 11/2019 | Ahn | H04B 7/06964 |
| 2020/0068574 A1* | 2/2020 | Qin | H04W 56/001 |
| 2021/0037500 A1* | 2/2021 | Liu | H04L 1/1822 |
| 2021/0153239 A1* | 5/2021 | Bai | H04L 69/324 |
| 2021/0250872 A1* | 8/2021 | Takeda | H04W 52/245 |
| 2021/0282114 A1* | 9/2021 | Liu | H04W 72/046 |

(Continued)

FOREIGN PATENT DOCUMENTS

| | | |
|---|---|---|
| CN | 111095819 A | 5/2020 |
| CN | 111294943 A | 6/2020 |

OTHER PUBLICATIONS

International Search Report and Written Opinion of International Application No. PCT/CN2020/070334, dated Oct. 9, 2021, 15 pages.

(Continued)

*Primary Examiner* — Otis L Thompson, Jr.
(74) *Attorney, Agent, or Firm* — Finnegan, Henderson, Farabow, Garrett & Dunner, L.L.P.

(57) ABSTRACT

A method for determining a beam is performed by a terminal, and includes: extracting multicast control information from multicast control information transmission resources; and determining a beam corresponding to the multicast control information based on an association relationship between multicast control information transmission resources and beams.

16 Claims, 5 Drawing Sheets obtaining configuration information of the multicast control information transmission resources — 301 determining the association relationship between multicast control information transmission resources and beams based on the configuration information — 302

(56) References Cited

U.S. PATENT DOCUMENTS

| | | | | |
|---|---|---|---|---|
| 2021/0321226 A1* | 10/2021 | Zhang | ............... | H04W 4/06 |
| 2021/0321452 A1* | 10/2021 | Zhang | ............... | H04L 5/0091 |
| 2022/0022237 A1* | 1/2022 | Kim | ............... | H04W 72/1273 |
| 2022/0046690 A1* | 2/2022 | Lee | ............... | H04W 4/08 |
| 2022/0210766 A1* | 6/2022 | Liu | ............... | H04W 72/30 |
| 2023/0209485 A1* | 6/2023 | Wei | ............... | H04W 56/0015 |
| | | | | 370/503 |
| 2023/0261729 A1* | 8/2023 | Huang | ............... | H04B 7/0857 |
| | | | | 375/267 |
| 2023/0284148 A1* | 9/2023 | Huang | ............... | H04W 52/0235 |
| | | | | 370/318 |
| 2024/0064491 A1* | 2/2024 | Babaei | ............... | H04L 12/189 |

OTHER PUBLICATIONS

CMCC, Discussion on NR MBS in RRC_Idle/RRC_Inactive states, 3GPP TSG RAN WG1 #103e, R1-2008036, e-Meeting, Oct. 26-Nov. 13, 2020, 3 pages.

Vivo, Discussion on basic functions for broadcast/multicast for RRC_Idle/RRC_Inactive UEs, 3GPP TSG RAN WG1 #103e, R1-2007693, E-Meeting, Oct. 26-Nov. 13, 2020, 3 pages.

The Second Office Action issued by the State Intellectual Property Office of People's Republic of China on Jul. 10, 2025, in corresponding Application No. CN 202180000161.9, 15 pages.

\* cited by examiner

BEAM DETERMINATION METHOD AND APPARATUS, AND COMMUNICATION DEVICE AND COMPUTER STORAGE MEDIUM

CROSS-REFERENCE TO RELATED APPLICATION

This application is the U.S. national application of International Application No. PCT/CN2021/070334, filed on Jan. 5, 2021, the entire contents of which are incorporated herein by reference.

TECHNICAL FIELD

The disclosure relates to a field of wireless communication technologies, in particular to a method and an apparatus for determining a beam, a communication device and a computer storage medium.

BACKGROUND

At present, when a network device (for example, a base station) transmits a downlink signal, the downlink beam signal may be sent at different times and in different directions in order to increase coverage. For example, a synchronization signal block (SSB) signals 1/2/3/4 are sent in different directions at a slot 1/2/3/4, where the SSB 1/2/3/4 are used to identify different beams. In the related art, the network device may also send the downlink signals through a plurality of beams.

SUMMARY

According to a first aspect of the disclosure, a method for determining a beam is performed by a terminal. The method includes: extracting multicast control information from multicast control information transmission resources; and determining a beam corresponding to the multicast control information based on an association relationship between multicast control information transmission resources and beams.

According to a second aspect of the disclosure, another method for determining a beam is performed by a network device. The method includes: obtaining multicast control information to be sent; obtaining multicast control information transmission resources, and determining a beam carrying the multicast control information transmission resources based on an association relationship between multicast control information transmission resources and beams; and sending the multicast control information transmission resources through the beam, in which the multicast control information is carried in the multicast control information transmission resources.

According to a third aspect of the disclosure, a communication device is provided, including: a transceiver; a memory; and a processor connected to the transceiver and the memory respectively. The processor is configured to perform the above method for determining a beam according to the first aspect or the second aspect.

BRIEF DESCRIPTION OF THE DRAWINGS

Example embodiments are described in detail below in conjunction with the accompanying drawings, wherein.

DETAILED DESCRIPTION

Figure 1:
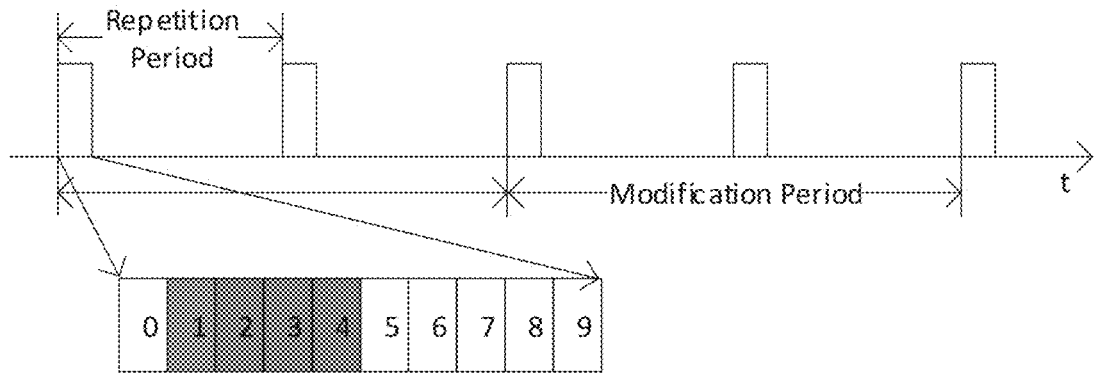
FIG. 1 is a schematic diagram of a control channel sending and updating way according to an embodiment of the disclosure.

Example embodiments are described in detail herein and illustrated in the accompanying drawings. Where the following description refers to the drawings, the same numerals in different drawings refer to the same or similar elements unless otherwise indicated. The implementations described in the following example embodiments do not represent all implementations consistent with the embodiments of the disclosure. Rather, they are merely examples of apparatuses and methods consistent with some aspects of the embodiments of the disclosure, as recited in the appended claims.

Terms used in the embodiments of the disclosure are only for the purpose of describing specific embodiments, and are not intended to limit the embodiments of the disclosure. As used in the examples of this disclosure and the appended claims, the singular forms "a/an" and "the" are also intended to include the plural unless the context clearly dictates otherwise. It should also be understood that the term "and/or" as used herein refers to and includes any and all possible combinations of one or more of the associated listed items.

It should be understood that, although the embodiments of the disclosure may use the terms first, second, third, etc. to describe various information, such information should not be limited to these terms. These terms are only used to distinguish information of the same type from one another. For example, without departing from the scope of the embodiments of the disclosure, first information may also be called second information, and similarly, second information may also be called first information. Depending on the context, the words if and "in case that" as used herein may be interpreted as "upon" or "when" or "in response to determining."

The embodiments of the disclosure are described in detail below, examples of which are illustrated in the accompanying drawings, in which like or similar reference numerals designate like or similar elements throughout. The embodiments described below by referring to the figures are exemplary and are intended to explain the disclosure and should not be construed as limiting the disclosure.

In the related art, Multimedia Broadcast and Multicast Service (MBMS) or Multicast Broadcast Service (MBS) is described as follows:

In a 5G NR (new radio access technology (RAT)) system, the MBS service may be sent through a physical downlink shared channel (PDSCH) scheduled by physical downlink control channel (PDCCH). The PDCCH for scheduling the MBS may be indicated by a scheduling identity specific to the MBS service, for example, MBS radio network temporary identity (M-RNTI).

The MBS service may be marked by the following "MBS service identifier":

① Temporary mobile group identity (TMGI);
② MBS session Identity (ID); and
③ MBS QoS flow ID.

The transmission mode of the MBS service may include the following two types:

Transmission mode 1: UE needs to enter a connected state to receive transmission configuration information of the MBS service, so as to receive the MBS service;

Transmission mode 2: UE may receive transmission configuration information of the MBS service and receive the MBS service in an IDLE state (i.e., an idle mode) or an INACTIVE state (i.e., an inactive mode).

For the above-mentioned transmission mode 2, the network device (for example, a base station) may send transmission configuration information of the MBS service to the UE in a way of combining system information and MCCH (MCCH) information.

The above-mentioned system information gives the transmission configuration information of the MCCH. For example, the network device (for example, a base station) provides configuration information of single cell MCCH (SC-MCCH) in system information SIB20 (i.e., system information block 20), in a single cell point-to-multipoint (SC-PTM) system of 4G long-term evolution (LTE), which may include:

① repetition period of the SC-MCCH channel, such as, sc-mcch-RepetitionPeriod shown in FIG. 1 (20 wireless frames);
② System frame transmission time offset of the SC-MCCH channel, such as, sc-mcch-Offset shown in FIG. 1 (1 wireless frame), where SFN mod sc-mcch-RepetitionPeriod=sc-mcch-Offset, SFN represents a system frame number;
③ Initial scheduling subframe FirstSubframe of the SC-MCCH channel, such as, sc-mcch-FirstSubframe shown in FIG. 1 (the first subframe);
④ Scheduling duration of the SC-MCCH channel, such as, sc-mcch-duration shown in FIG. 1 (4 subframes), i.e., a scheduling duration starting from a subframe position indicated by sc-mcch-FirstSubframe;
⑤ Modification period of the SC-MCCH channel shown in FIG. 1 (40 wireless frames). The control signaling content sent by the SC-MCCH channel is the same within the modification period.

When information content of the MCCH is modified, the network device (for example, a base station) indicates that the information content of the MCCH is modified in the first subframe of the repetition period of the MCCH. As shown in FIG. 1, it is indicated at the subframe 1 that SC-MCCH channel information is modified. When UE receives the change notification, the UE may immediately re-receive information of the modified MCCH from the subframe where the modification instruction is received. As shown in FIG. 1, after the UE receives a change notification about information content of the SC-MCCH channel at the subframe 1, UE receives information content of the SC-MCCH channel at the subframe 1 again.

The MCCH provides transmission configuration information of a data channel of a multicast service, e.g., a multicast traffic channel (MTCH). For example, in the SC-PTM system of 4G LTE, the network device (for example, a base station) provides a MTCH configuration of its local cell (i.e., single cell-MTCH, SC-MTCH for short) in a SC-MCCH control signaling and MBS service information of a neighbor cell, which may include:

① MTCH configuration (InfoList) of the local cell, for example, sc-mtch-InfoList; and
② MBS service information (NeighborCellList) of the neighbor cell, for example, sc-ptm-NeighbourCellList.

MTCH configuration of the local cell at ① may include:
1. MBS session information (e.g., a service ID (e.g., TMGI-1) and a session ID (e.g., session-1));
2. Scheduling ID (e.g., an identity "G-RNTI-1" of the PDCCH used to schedule the MBS service);
3. SC-MTCH scheduling information "schedulingInfo", e.g., sc-mtch-schedulingInfo, which includes: discontinuous scheduling time information of discontinuous reception (DRX) for a specific MBS service, e.g., a reception period and a start offset (i.e., schedulingPeriodStartOffsetSCPTM); service reception duration within a period (i.e., onDurationTimerSCPTM).

The method and apparatus for determining a beam, communication device, and computer storage medium according to the disclosure are described below with reference to the accompanying drawings.

Figure 2:
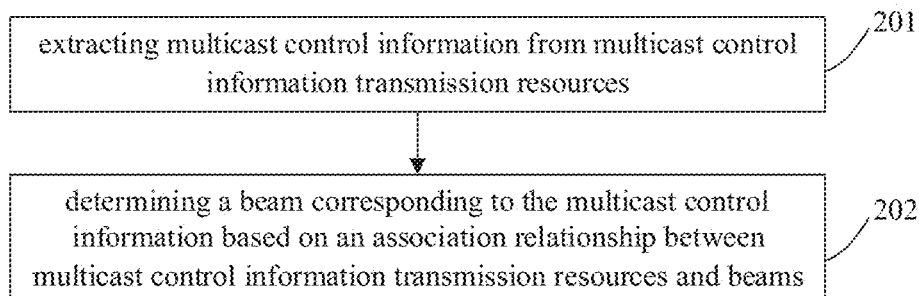
FIG. 2 is a schematic flowchart of a method for determining a beam according to an embodiment of the disclosure.

FIG. 2 is a schematic flowchart of a method for determining a beam according to an embodiment of the disclosure, which may be applied to a terminal (i.e., user equipment, UE), such as a mobile terminal (for example, a mobile phone and a tablet computer).

The method for determining a beam in the embodiment of the disclosure may also be executed by an apparatus for determining a beam according to the embodiment of the disclosure. The apparatus may be configured in a communication device (for example, UE), so as to realize that multicast control information is extracted from multicast control information transmission resources, and a beam corresponding to the multicast control information is determined based on an association relationship between multicast control information transmission resources and beams. In this way, the reliability of UE receiving the multicast control information on a plurality of beams may be effectively improved.

As shown in FIG. 2, the method for determining a beam may include the following steps.

At 201, multicast control information is extracted from multicast control information transmission resources.

In the embodiment of the disclosure, the multicast control information transmission resources may be sent by a base station. It should be noted that the base station described in this embodiment may include a cell that provides service to a plurality of UEs. Depending on a specific application, the base station may also be called an access point, or a device in an access network that communicates with wireless UE (such as a mobile terminal) through one or more sectors on the air interface, or other names. The base station may be a network device.

In an embodiment of the disclosure, the multicast control information may include at least one of MCCH information and MCCH change notification.

In another embodiment of the disclosure, the multicast control information transmission resources may include one or more of scheduling control signaling transmission resources of the multicast control information, data transmission resources of the multicast control information and change notification transmission resources of the multicast control information.

Specifically, the base station may send the multicast control information transmission resources through a beam. After UE receives the multicast control information transmission resources, UE may parse the multicast control information transmission resources to obtain the multicast control information included in the multicast control information transmission resources. It should be noted that the beam described in this embodiment may be a downlink beam signal.

In the embodiment of the disclosure, the base station may send the multicast control information transmission resources through a plurality of beams, where the a plurality of beams may be all beams that may be used to send the multicast control information transmission resources in the base station, or may also be at least one beam among all the beams that may be determined by the base station to send the multicast control information transmission resources according to a preset association relationship.

At 202, a beam corresponding to the multicast control information is determined the beam corresponding to the multicast control information based on an association relationship between multicast control information transmission resources and beams.

It should be noted that the association relationship between multicast control information transmission resources and beams described in this embodiment may be pre-stored in a storage space of the UE for easy retrieval and use. The storage space is not limited to a storage space based on a physical entity, such as a hard disk, and it may also be a storage space (cloud storage space) of a server (for example, a hospital server) connected to an electronic device. The association relationship between multicast control information transmission resources and beams described in this embodiment may be generated in the base station and sent in advance to the UE through a radio resource control (RRC) signaling, or it may be an association relationship agreed upon by the base station and the UE (for example, a protocol specifies a beam number and its associated multicast control information transmission resources), which may be automatically generated at the base station and the UE respectively. The association relationship is not limited here.

Specifically, after the UE extracts the MCCH information from the multicast control information transmission resources, UE may call out the association relationship between multicast control information transmission resources and beams from its own storage space, and determine the beam corresponding to the multicast control information based on the association relationship.

In the embodiment of the disclosure, the multicast control information is firstly extracted from the multicast control information transmission resources, and the beam corresponding to the multicast control information is determined based on the association relationship between the multicast control information transmission resources and the beams. In this way, the reliability of the UE receiving multicast control information on multi-beams may be effectively improved.

In order to clearly describe the previous embodiment, the base station in this embodiment of the disclosure may obtain multicast control information to be sent and multicast control information transmission resources, then send the multicast control information transmission resources through a plurality of beams. The multicast control information is carried in the multicast control information transmission resources and the a plurality of beams may be all beams that may be used to send the multicast control information transmission resources in the base station.

Specifically, the base station may provide the "MCCH information transmission resources". For example, the multicast control information is sent to the UE through the MCCH channel in a logical channel, and a MCCH signaling is sent to the UE through the PDSCH scheduled by the PDCCH (for example, the PDCCH identified by the MC-RNTI). The base station provides monitoring resources through system information SIB15, such as, a control resource set CORESET-1, that is, frequency domain resources, and/or a search space SearchSpace-1, that is, time-domain resources (e.g., a transmission period).

The "MCCH information transmission resources" may include scheduling control signaling transmission resources, e.g., PDCCH transmission resources used to schedule transmission of the MCCH signaling, that is, the above-mentioned scheduling control signaling transmission resources of the multicast control information; data transmission resources, e.g., PDSCH resources used to send an MCCH signaling, that is, the above-mentioned data transmission resources of the multicast control information.

Further, the base station may also provide the "MCCH change notification transmission resources". For example, the MCCH change notification is sent to the UE through downlink control information (DCI) in the PDCCH (such as the PDCCH identified by the N-RNTI). The base station may provide monitoring resources of the PDCCH for sending the "MCCH change notification" through the system information SIB15, such as, CORESET-2 and/or SearchSpace-2.

It may be seen that, the base station may provide the "multicast control information transmission resources", which may include one or more of scheduling control signaling transmission resources of the multicast control information, data transmission resources of the multicast control information and change notification transmission resources of the multicast control information.

Then, the base station may obtain the multicast control information to be sent, put the multicast control information to be sent into corresponding multicast control information transmission resources, and send the multicast control information transmission resources through a plurality of beams.

Further, in the embodiment of the disclosure, the base station may obtain the multicast control information to be sent, obtain the multicast control information transmission resources, and determine a beam carrying the multicast control information transmission resources based on the association relationship between the multicast control information transmission resources and the beams. As such, the multicast control information transmission resources is sent through the beam, in which the multicast control information transmission resources carry the multicast control information.

Specifically, the base station may provide the "multicast control information transmission resources", obtain multicast control information to be sent, and put the multicast control information to be sent into corresponding multicast control information transmission resources. Then the base station obtains the association relationship between the multicast control information transmission resources and the beams, and determines the beam carrying the multicast control information transmission resources according to the association relationship, in which the association relationship may be agreed by a protocol. For example, the base station provides the monitoring resources (such as CORESET-1 and/or SearchSpace-1) of the PDCCH that sends the MCCH signaling through the system information SIB15. For multiple PDCCH resources in a period of sending the MCCH signaling, it is agreed in the protocol that the $x^{th}$ PDCCH resource (or all the PDCCH resources) may be used to send the "multicast control information transmission resources", where x may be a positive integer, which is not limited here. Then, the multicast control information transmission resources are sent through the determined beam.

Figure 3:
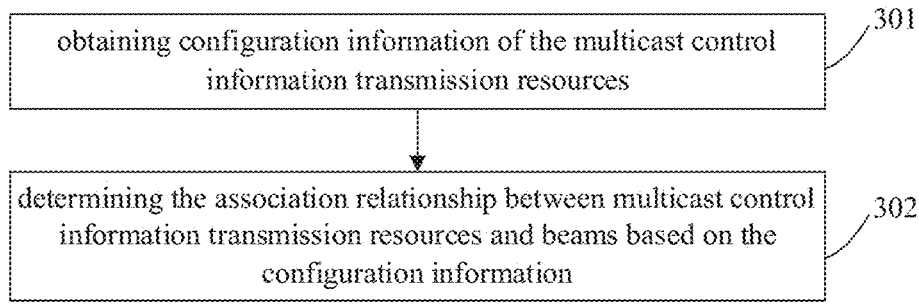
FIG. 3 is a schematic flowchart of another method for determining a beam according to an embodiment of the disclosure.

In an embodiment of the disclosure, as shown in FIG. 3, the method for determining a beam may further include the following steps.

At 301, configuration information of the multicast control information transmission resources is obtained. The configuration information may be a configuration identifier of the PDCCH, where the configuration identifier may be a search space "SearchSpace".

In the embodiment of the disclosure, the configuration information may be sent by the base station to the UE through an RRC signaling. The base station may generate the configuration information according to the association relationship between the multicast control information transmission resources and the beams, and the association relationship may be directly specified by the base station, for example, the base station specifies the association relationship between beam numbers and the multicast control information transmission resources.

Specifically, the base station may directly specify some beams for sending the multicast control information transmission resources according to needs, establish the association relationship between beam numbers of these beams and the multicast control information transmission resources and store the established association relationship for subsequent call. For example, the base station configures the PDCCH resource configuration (SearchSpace-1) for sending the MCCH signaling. For the SearchSpace-1, the base station specifies its associated beam-1 (e.g., SSB-1). For example, the base station configures the PDCCH resource configuration SearchSpace-1 for sending the MCCH signaling, where the configuration SearchSpace-1 indicates that there are 2 PDCCH resources (i.e., PDCCH-1 and PDCCH-2) per 10 slots. Then, the base station may indicate that PDCCH-1 corresponds to SSB-1, and PDCCH-2 corresponds to SSB-2.

At the same time, the base station may also generate configuration information based on the association relationship, and send the configuration information to the UE through the RRC signaling. The UE receives the configuration information of the multicast control information transmission resources sent by the base station.

At 302, an association relationship between multicast control information transmission resources and beams is determined based on the configuration information.

Specifically, after receiving the configuration information of the multicast control information transmission resources sent by the base station, the UE may analyze the configuration information to determine the association relationship between the multicast control information transmission resources and the beams. For example, the base station configures the PDCCH resource configuration SearchSpace-1 for sending the MCCH signaling, and the base station specifies its associated beam-1 (e.g., SSB-1) for the SearchSpace-1. For example, the base station configures the PDCCH resource configuration SearchSpace-1 for sending the MCCH signaling, and the configuration SearchSpace-1 indicates that there are 2 PDCCH resources (i.e., PDCCH-1 and PDCCH-2) per 10 slots. Then, the base station may indicate that PDCCH-1 corresponds to SSB-1, and PDCCH-2 corresponds to SSB-2.

Figure 4:
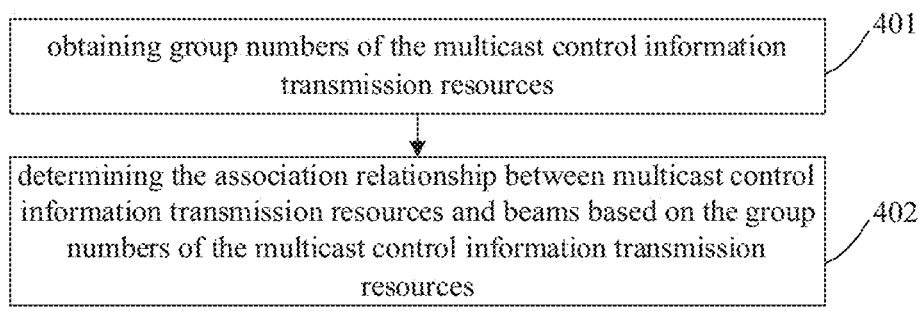
FIG. 4 is a schematic flowchart of yet another method for determining a beam according to an embodiment of the disclosure.

In an embodiment of the disclosure, as shown in FIG. 4, the method for determining a beam may further include the following steps.

At 401, group numbers of the multicast control information transmission resources are obtained.

In the embodiment of the disclosure, the group numbers may be group numbers agreed in a protocol. It may be agreed in the protocol that a "multicast control information transmission resource of a specific number" correspond to a "beam of a specific number". The "multicast control information transmission resources" are grouped according to a "number of beams corresponding to the transmission resources", and the group number corresponding to the "multicast control information transmission resource" correspond to a specific beam number. The identification information of the beam may include at least one of: a channel state information-reference signal (CSI-RS) identifier (for example, CSI-RS-1), a SSB identifier (for example, SSB-1), and so on.

At 402, the association relationship between multicast control information transmission resources and beams is determined based on the group numbers of the multicast control information transmission resources. The multicast control information transmission resources may be grouped in an interlaced or continuous way based on a time order. A total number of groups may be determined by a total number of beams. For example, the total number of beam numbers (such as SSB numbers) obtained by the UE from the system information is "a", the total number of groups of the multicast control information transmission resources is also equal to a, and the SSB number is the same as the group number of the multicast control information transmission resource, where a may be a positive integer.

Specifically, after the UE extracts the MCCH information from the multicast control information transmission resources, UE may obtain group numbers agreed in a protocol (that is, the group numbers of the multicast control information transmission resources), and may group the "multicast control information transmission resources" in an interlaced way based on a time order according to the group numbers. For example, referring to FIG. 5, there are 8 PDCCH transmission resources (that is, PDCCH-1/PDCCH-2/PDCCH-3/PDCCH-4 and PDCCH-6/PDCCH-7/PDCCH-8/PDCCH-9) in one transmission period of MCCH information, the system information SIB-1 indicates that the cell has 4 beams (i.e., SSB-1/SSB-2/SSB-3/SSB-4), then the 8 PDCCHs are divided into 4 beam groups, where the PDCCH-1/PDCCH-6 may correspond to the beam-1 (i.e., SSB-1), the PDCCH-2/PDCCH-7 may correspond to the beam-2 (i.e., SSB-2), the PDCCH-3/PDCCH-8 may correspond to the beam-3 (i.e., SSB-3), and the PDCCH-4/PDCCH-9 may correspond to the beam-4 (i.e., SSB-4).

Alternatively, the "multicast control information transmission resources" may be continuously grouped according to the group numbers, that is, dividing into the same group. For example, referring to FIG. 6, there are 8 PDCCH transmission resources (that is, PDCCH-1/PDCCH-2/PDCCH-3/PDCCH-4 and PDCCH-6/PDCCH-7/PDCCH-8/PDCCH-9) in 1 transmission period of MCCH information, the system information SIB-1 indicates that the cell has 2 beams (i.e., SSB-1/SSB-2), then the 8 PDCCHs are divided into 2 beam groups, where the PDCCH-1/PDCCH-2/PDCCH-3/PDCCH-4 corresponds to the beam-1 (i.e., SSB-1), and PDCCH-6/PDCCH-7/PDCCH-8/PDCCH-9 corresponds to the beam-2 (i.e., SSB-2).

Thus, the UE may determine the association relationship between the multicast control information transmission resources and the beam according to the above group numbers, and determine the beam corresponding to the multicast control information according to the association relationship, where the beam may be at least one.

Further, in an embodiment of the disclosure, after determining the beam corresponding to the multicast control information according to the association relationship between multicast control information transmission resources and beams, the method may also include: in response to a plurality of beams being determined, determining a target beam from the plurality of beams determined; and obtaining the multicast control information sent by the target beam by monitoring multicast control information transmission resources corresponding to the target beam.

It should be noted that a plurality of beams are determined as described in this embodiment, which may indicate that the plurality of beams may all be used to carry the multicast control information transmission resources, and the UE may select any one from the plurality of beams to obtain the multicast control information transmission resources.

Specifically, after the UE determines the plurality of beams corresponding to the multicast control information, UE may select at least one beam from the plurality of beams, and monitor the content carried in the selected beam. The UE may select at least one beam (i.e., the target beam) from the plurality of beams, according to a preset selection strategy. The preset selection strategy may be calibrated according to actual conditions. Then, the UE monitors the multicast control information transmission resources corresponding to the at least one beam, so as to obtain the multicast control information sent by the at least one beam.

Further, assuming that the multicast control information received by the UE is a MCCH change notification, the UE may control the MCCH to change according to the MCCH change notification after receiving the MCCH change notification and when the change is made, the UE may determine a beam associated with the MCCH change notification and receive information of the MCCH through the "MCCH information transmission resource" associated with the beam.

In order to clearly describe the previous embodiment, in an embodiment of the disclosure, determining the target beam from the plurality of beams determined may include obtaining signal qualities of the plurality of beams, and selecting the target beam based on the signal qualities.

Specifically, after the UE determines the plurality of beams corresponding to the multicast control information, UE may respectively detect the signal qualities of the plurality of beams, take a beam with the best signal quality as the target beam, and a multicast control information transmission resource corresponding to the target beam is monitored to obtain the MCCH change notification sent by the target beam.

In order to clearly illustrate the previous embodiment, in another embodiment of the disclosure, determining the target beam from the plurality of beams determined may include: obtaining signal qualities of the plurality of beams; selecting beams with a signal quality being greater than a quality threshold from the plurality of beams as a plurality of candidate beams; and selecting the target beam from the plurality of candidate beams. The quality threshold may be calibrated according to the actual conditions, for example, the quality threshold may be a quality threshold agreed in the protocol, or a quality threshold specified by the above configuration information.

Specifically, after determining the plurality of beams corresponding to the multicast control information, the UE may respectively detect signal qualities of the plurality of beams, take beams each having a signal quality is greater than the quality threshold among the plurality of beams as candidate beams, and randomly select at least one beam from the candidate beams as the target beam, so as to monitor the content carried in the target beam.

Figure 5:
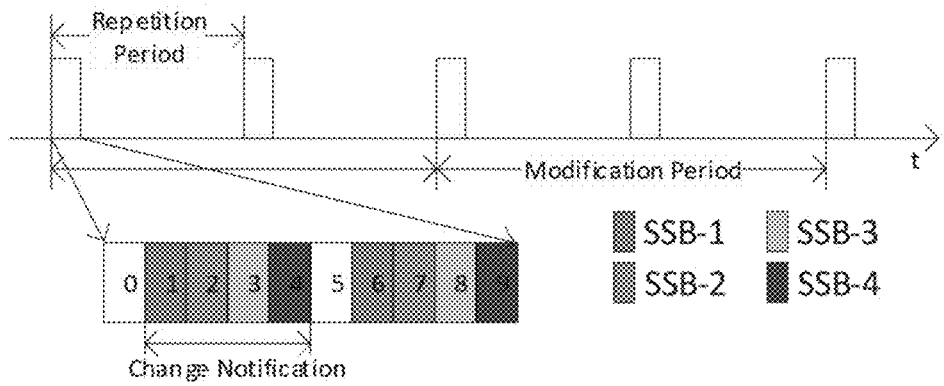
FIG. 5 is a schematic diagram of a method for associating multicast control information transmission resources according to an embodiment of the disclosure.
Figure 6:
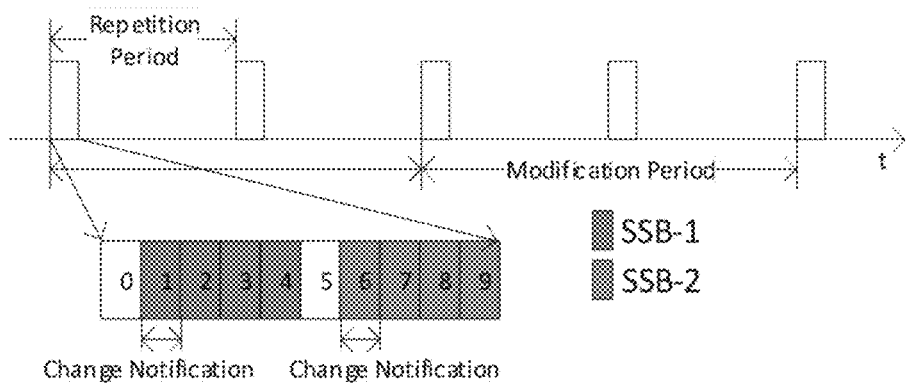
FIG. 6 is a schematic diagram of another method for associating multicast control information transmission resources according to an embodiment of the disclosure.

For example, referring to FIG. 5, if the UE detects that the signal quality of SSB-1 is relatively good, for example, the reference signal received power (RSRP) measurement result of SSB-1 is greater than or equal to the quality threshold, then the UE may only monitor PDCCH-1/PDCCH-6. Referring to FIG. 6, if the UE detects that the signal quality of SSB-1 is relatively good, the UE may only monitor PDCCH-1/PDCCH-2/PDCCH-3/PDCCH-4.

Further, in an embodiment of the disclosure, the method for determining a beam may further include obtaining spatial information of the beam, in which the spatial information is used to receive the multicast control information. The spatial information may include at least one of Doppler shift information, Doppler spread information, average delay information, delay spread information or spatial receiver parameter information.

It should be noted that the spatial information described in this embodiment may be spatial information of a signal on a beam, and the beam may be the aforementioned target beam.

Specifically, the UE may obtain spatial information of a signal on a received beam (e.g., a target beam), and use the spatial information for a physical channel associated with the beam for sending the "multicast control information". For example, the PDCCH resource-1 corresponding to MCCH information reception is associated with SSB-1, and the spatial information of SSB-1 may be used for receiving the channel PDCCH of the PDCCH resource-1. For another example, the PDCCH resource-1 corresponding to MCCH information reception is associated with SSB-1, and the spatial information of SSB-1 may be used for receiving the channel PDSCH scheduled by the PDCCH resource-1.

Furthermore, in the embodiments of the disclosure, when the "MCCH change notification transmission resources" is included in the "MCCH information transmission resources", the "MCCH change notification transmission resources" may be allocated according to the following allocation methods:

When the above-mentioned association relationship is an association relationship agreed in a protocol between the base station and the UE and the "MCCH information transmission resources" are grouped in an interleaved way based on a time order, the "MCCH change notification transmission resources" may be "MCCH information transmission resources" corresponding to y consecutive beams contained in the xth group. For example, referring to FIG. 5, there are 8 PDCCH transmission resources (i.e., PDCCH-1/PDCCH-2/PDCCH-3/PDCCH-4 and PDCCH-6/PDCCH-7/PDCCH-8/PDCCH-9) in one transmission period of MCCH information, the system information SIB-1 indicates that the cell has 4 beams (i.e., SSB-1/SSB-2/SSB-3/SSB-4), then the 8 PDCCHs are divided into 4 beam groups, Then the 8 PDCCHs may be divided into 4 beam groups, where the PDCCH-1/PDCCH-6 may correspond to the beam-1 (i.e., SSB-1), the PDCCH-2/PDCCH-7 may correspond to the beam-2 (i.e., SSB-2), the PDCCH-3/PDCCH-8 may correspond to the beam-3 (i.e., SSB-3), and the PDCCH-4/PDCCH-9 may correspond to the beam-4 (i.e., SSB-4). Then the PDCCH-1/PDCCH-2/PDCCH-3/PDCCH-4 correspond to consecutive beams (i.e., beam-1/beam-2/beam-3/beam-4), of which the group number is 1. The PDCCH-6/PDCCH-7/PDCCH-8/PDCCH-9 correspond to the consecutive beams (i.e., beam-1/beam-2/beam-3/beam-4), of which the group number is 2. The first group of PDCCH-1/PDCCH-2/PDCCH-3/PDCCH-4 are the MCCH change notification transmission resources.

When the above-mentioned association relationship is an association relationship agreed in a protocol between the base station and the UE and the "multicast control information transmission resources" are consecutively grouped (divided into the same group), the "MCCH change notification transmission resource" is the xth resource among the resources corresponding to each beam. For example, referring to FIG. 6, there are 8 PDCCH transmission resources (i.e., PDCCH-1/PDCCH-2/PDCCH-3/PDCCH-4 and PDCCH-6/PDCCH-7/PDCCH-8/PDCCH-9) in one MCCH information transmission period, and the system information SIB-1 indicates that the cell has 2 beams (i.e., SSB-1/SSB-2), then the 8 PDCCHs are divided into 2 beam groups, where the PDCCH-1/PDCCH-2/PDCCH-3/PDCCH-4 corresponds to the beam-1 (i.e., SSB-1), and PDCCH-6/PDCCH-7/PDCCH-8/PDCCH-9 corresponds to the beam-2 (i.e., SSB-2). Then the first resource (i.e., PDCCH-1/PDCCH-6) of beam-1 and beam-2 is the "MCCH change notification transmission resources".

According to the method for determining a beam in the embodiment of the disclosure, the multicast control information is extracted from the multicast control information transmission resources, and the beam corresponding to the multicast control information is determined based on the association relationship between multicast control information transmission resources and beams. In this way, it may be ensured that the UE may receive the multicast control information on different beams, thus effectively improving the reliability of the UE receiving the multicast control information on a plurality of beams.

Figure 7:
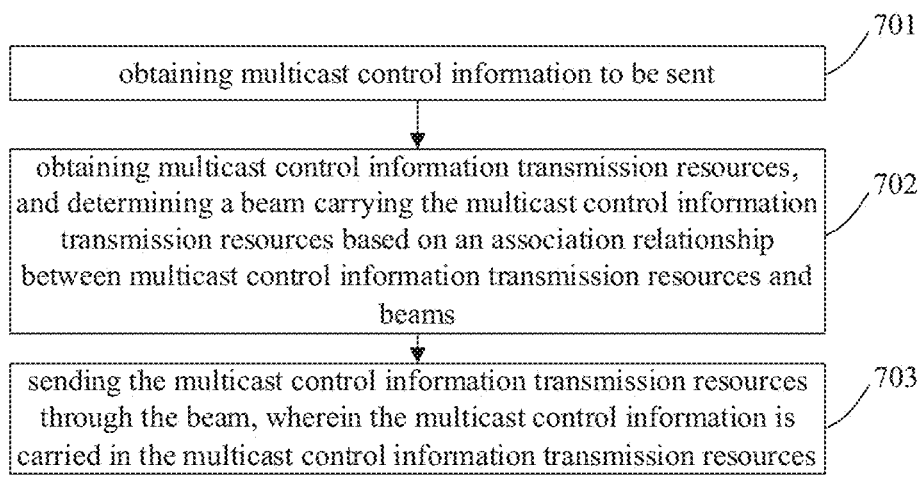
FIG. 7 is a schematic flowchart of another method for determining a beam according to an embodiment of the disclosure.

FIG. 7 is a schematic flowchart of another method for determining a beam according to an embodiment of the disclosure, which may be applied to a network side, for example, a base station. It should be noted that the base station described in this embodiment may include a cell that provides service to a plurality of UEs. Depending on a specific application, the base station may also be called an access point, or a device in an access network that communicates with wireless UE (such as a mobile terminal) through one or more sectors on the air interface, or other names. The base station may be a network device.

The method for determining a beam in the embodiment of the disclosure may also be executed by an apparatus for determining a beam according to the embodiment of the disclosure. The apparatus may be configured in a communication device (for example, a base station) to obtain multicast control information to be sent, and obtain multicast control information transmission resources, determine a beam carrying the multicast control information transmission resources based on an association relationship between multicast control information transmission resources and beams, and send the multicast control information transmission resources through the beam, thus effectively improving the reliability of the UE receiving the multicast control information on a plurality of beams.

As shown in FIG. 7, the method for determining a beam may include the following steps At 701, multicast control information to be sent is obtained. The multicast control information may include at least one of MCCH information and MCCH change notification.

At 702, multicast control information transmission resources are obtained, and a beam carrying the multicast control information transmission resources is determined based on an association relationship between multicast control information transmission resources and beams. The multicast control information transmission resources may include one or more of scheduling control signaling transmission resources of the multicast control information, data transmission resources of the multicast control information or change notification transmission resources of the multicast control information.

At 703, the multicast control information transmission resources are sent through the beam. The multicast control information the multicast control information transmission resources.

Specifically, the base station may provide the "MCCH information transmission resources". For example, the multicast control information is sent to the UE through the MCCH channel in a logical channel, and a MCCH signaling is sent to the UE through the PDSCH scheduled by the PDCCH (for example, the PDCCH identified by the MC-RNTI). The base station provides monitoring resources through system information SIB15, such as, a control resource set CORESET-1, that is, frequency domain resources, and/or a search space SearchSpace-1, that is, time-domain resources (e.g., a transmission period).

The "MCCH information transmission resources" may include scheduling control signaling transmission resources, e.g., PDCCH transmission resources used to schedule transmission of the MCCH signaling, that is, the above-mentioned scheduling control signaling transmission resources of the multicast control information; data transmission resources, e.g., PDSCH resources used to send an MCCH signaling, that is, the above-mentioned data transmission resources of the multicast control information.

Further, the base station may also provide the "MCCH change notification transmission resources". For example, the MCCH change notification is sent to the UE through downlink control information (DCI) in the PDCCH (such as the PDCCH identified by the N-RNTI). The base station may provide monitoring resources of the PDCCH for sending the "MCCH change notification" through the system information SIB15, such as, CORESET-2 and/or SearchSpace-2.

It may be seen that, the base station may provide the "multicast control information transmission resources", which may include one or more of scheduling control signaling transmission resources of the multicast control information, data transmission resources of the multicast control information and change notification transmission resources of the multicast control information.

Then, the base station can obtain the multicast control information to be sent, and put the multicast control information to be sent into corresponding multicast control information transmission resources. Then the base station may obtain the association relationship between multicast control information transmission resources and beams, and determine the beam carrying the multicast control information transmission resources based on the association relationship, in which the association relationship may be agreed by a protocol. For example, the base station provides the monitoring resources (such as CORESET-1 and/or SearchSpace-1) of the PDCCH that sends the MCCH signaling through the system information SIB15. For multiple PDCCH resources in a period of sending the MCCH signaling, it is agreed in the protocol that the $x^{th}$ PDCCH resource (or all the PDCCH resources) may be used to send the "multicast control information transmission resources", where x may be a positive integer, which is not limited here. Then, the multicast control information transmission resources are sent through the determined beam.

The base station may also directly specify the above-mentioned association relationship between multicast control information transmission resources and beams.

In the embodiment of the disclosure, the multicast control information to be sent is first obtained, the multicast control information transmission resources are obtained, the beam carrying the multicast control information transmission resources is determined based on the association relationship between multicast control information transmission resources and beams, and the multicast control information transmission resources is sent through the beam. In this way, the reliability of the UE receiving the multicast control information on a plurality of beams may be effectively improved.

Further, in an embodiment of the disclosure, the method for determining a beam further includes generating configuration information based on the association relationship between multicast control information transmission resources and beams, and sending the configuration information through a radio resource control (RRC) signaling.

Specifically, the base station may directly specify some beams for sending the multicast control information transmission resources according to needs, establish the association relationship between beam numbers of these beams and the multicast control information transmission resources and store the established association relationship for subsequent call. For example, the base station configures the PDCCH resource configuration (SearchSpace-1) for sending the MCCH signaling. For the SearchSpace-1, the base station specifies its associated beam-1 (e.g., SSB-1). For example, the base station configures the PDCCH resource configuration SearchSpace-1 for sending the MCCH signaling, where the configuration SearchSpace-1 indicates that there are 2 PDCCH resources (i.e., PDCCH-1 and PDCCH-2) per 10 slots. Then, the base station may indicate that PDCCH-1 corresponds to SSB-1, and PDCCH-2 corresponds to SSB-2.

At the same time, the base station may also generate configuration information based on the association relationship, and send the configuration information to the UE through the RRC signaling. The UE receives the configuration information of the multicast control information transmission resources sent by the base station.

Optionally, the multicast control information transmission resources include one or more of scheduling control signaling transmission resources of the multicast control information, data transmission resources of the multicast control information, and MCCH change notification transmission resources.

It should be noted that, the above explanations on the embodiments of the method for determining a beam according to FIGS. 2 to 6 are also applicable to the method for determining a beam in this embodiment, which may not be repeated here.

According to the method for determining a beam in the embodiment of the disclosure, the multicast control information to be sent is first obtained, the multicast control information transmission resources are obtained, and the beam carrying the multicast control information transmission resources is determined based on the association relationship between multicast control information transmission resources and beam, and send the multicast control information transmission resources through the beam. Therefore, it may be ensured that the UE may receive the multicast control information on different beams, thus effectively improving the reliability of the UE receiving the multicast control information on a plurality of beams.

Figure 8:
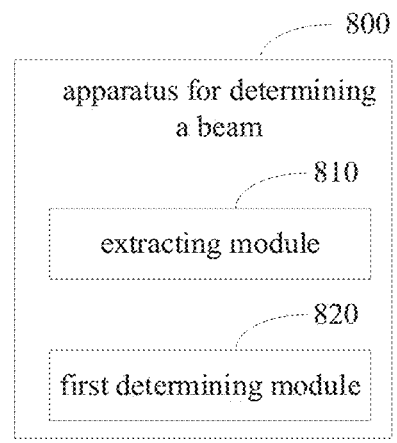
FIG. 8 is a block diagram of an apparatus for determining a beam according to an embodiment of the disclosure.

FIG. 8 is a schematic block diagram of an apparatus for determining a beam according to an embodiment of the disclosure. The apparatus may be applied to a terminal (i.e., user equipment, UE), such as a mobile terminal (for example, a mobile phone and a tablet computer).

The apparatus for determining a beam according to the embodiment of the disclosure may be configured in a communication device (for example, the UE) to extract multicast control information from multicast control information transmission resources, and determine a beam corresponding to the multicast control information is determined based on an association relationship between multicast control information transmission resources and beams. In this way, the reliability of UE receiving the multicast control information on a plurality of beams may be effectively improved.

As shown in FIG. 8, the apparatus 800 for determining a beam may include: an extracting module 810 and a first determining module 820.

The extracting module 810 is configured to extract multicast control information from multicast control information transmission resources.

The first determining module 820 is configured to determine a beam corresponding to the multicast control information based on an association relationship between multicast control information transmission resources and beams.

Optionally, the apparatus 800 for determining the beam further includes: a first obtaining module and a second determining module.

The first obtaining module is configured to obtain configuration information of the multicast control information transmission resources.

The second determining module is configured to determine the association relationship between multicast control information transmission resources and beams based on the configuration information.

Optionally, the configuration information is a configuration identifier of the physical downlink control channel (PDCCH).

Optionally, the apparatus 800 for determining the beam may further include: a second obtaining module and a third determining module.

The second obtaining module is configured to obtain group numbers of the multicast control information transmission resources.

The third determining module is configured to determine the association relationship between multicast control information transmission resources and beams based on the group numbers of the multicast control information transmission resources.

Optionally, the multicast control information transmission resources are grouped in an interlaced or continuous way based on a time order.

Optionally, the first determining module 820 may include: a determining unit and an obtaining unit.

The determining unit is configured to in response to a plurality of beams being determined, determine a target beam from the plurality of beams determined.

The obtaining unit is configured to obtain the multicast control information sent by the target beam by monitoring multicast control information transmission resources corresponding to the target beam.

Optionally, the determining unit is specifically configured to: obtain signal qualities of the plurality of beams; and select the target beam based on the signal qualities.

Optionally, the determining unit is specifically configured to: obtain signal qualities of the plurality of beams; select beams with a signal quality being greater than a quality threshold from the plurality of beams as a plurality of candidate beams; and select the target beam from the plurality of candidate beams.

Optionally, the apparatus for determining a beam further includes: a third obtaining module, configured to obtain spatial information of the beam, in which the spatial information is used to receive the multicast control information.

Optionally, the spatial information includes at least one of Doppler shift information, Doppler spread information, average delay information, delay spread information or spatial receiver parameter information.

Optionally, the multicast control information includes at least one of multicast control channel (MCCH) information or MCCH change notification.

Optionally, the multicast control information transmission resources include one or more of scheduling control signaling transmission resources of the multicast control information, data transmission resources of the multicast control information, and MCCH change notification transmission resources.

It should be noted that the above explanations for the embodiments of the method for determining a beam according to FIGS. 2 to 6 are also applicable to the apparatus for determining a beam in this embodiment, which are not repeated here.

The apparatus for determining a beam according to the embodiment of the disclosure, an extracting module is used to extract multicast control information from multicast control information transmission resources, and a first determining module is used to determine a beam corresponding to the multicast control information based on the association relationship between multicast control information transmission resources and beams. Therefore, it may be ensured that the UE may receive the multicast control information on different beams, thus effectively improving the reliability of the UE receiving the multicast control information on a plurality of beams.

Figure 9:
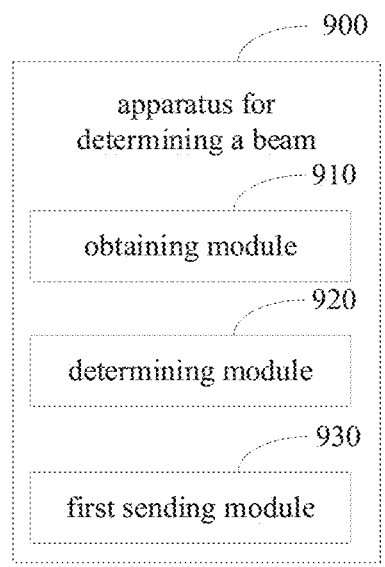
FIG. 9 is a block diagram of another apparatus for determining a beam according to an embodiment of the disclosure.

FIG. 9 is a schematic block diagram of another apparatus for determining a beam according to an embodiment of the disclosure. The apparatus may be applied to a network side, for example, a base station.

The apparatus for determining a beam according to the embodiment of the disclosure may be configured in a communication device (for example, a base station), so as to obtain multicast control information to be sent, obtain multicast control information transmission resources, determine a beam carrying the multicast control information transmission resources based on an association relationship between multicast control information transmission resources and beams, and send the multicast control information transmission resources through the beam. In this way, the reliability of UE receiving the multicast control information on a plurality of beams is effectively improved.

As shown in FIG. 9, the apparatus 900 for determining a beam may include: an obtaining module 910, a determining module 920 and a first sending module 930.

The obtaining module 910 is configured to obtain multicast control information to be sent.

The determining module 920 is configured to obtain multicast control information transmission resources, and determine a beam carrying the multicast control information transmission resources based on an association relationship between multicast control information transmission resources and beams.

The first sending module 930 is configured to send the multicast control information transmission resources through the beam, in which the multicast control information is carried in the multicast control information transmission resources.

Optionally, the apparatus 900 for determining a beam may further include: a generating module and a second sending module.

The generating module is configured to generate configuration information based on the association relationship between multicast control information transmission resources and beams.

The second sending module is configured to send the configuration information through a radio resource control (RRC) signaling.

Optionally, the multicast control information transmission resources include one or more of scheduling control signaling transmission resources of the multicast control information, data transmission resources of the multicast control information or MCCH change notification transmission resources.

It should be noted that the above explanations for the embodiments of the method for determining the beam according to FIGS. 2 to 6 are also applicable to the apparatus for determining a beam in this embodiment, which are not repeated here.

The apparatus for determining a beam in the embodiment of the disclosure obtains the multicast control information to be sent through the obtaining module, obtains the multicast control information transmission resources through the determining module, determines the beam carrying multicast control information transmission resources based on the association relationship multicast control information transmission resources and beams, and sends the multicast control information transmission resources through the beam by the first sending module. Therefore, it may be ensured that the UE may receive the multicast control information on different beams, thereby effectively improving the reliability of the UE receiving the multicast control information on a plurality of beams.

In order to implement the above embodiments, the disclosure also proposes a communication device.

The communication device according to the embodiments of the disclosure includes a processor, a transceiver, a memory, and an executable program stored on the memory and capable of being run by the processor. The foregoing method is executed when the processor runs the executable program.

The communication device may be the above network device or terminal device.

The processor may include various types of storage media, which are non-transitory computer storage media, and may continue to memorize and store information on the media after the communication device is powered off. Here, the communication device includes a base station or a terminal.

The processor may be connected to the memory through a bus or the like, and is used to read the executable program stored on the memory, for example, as shown in at least one of FIG. 2 to FIG. 7.

In order to realize the above-mentioned embodiments, the disclosure also proposes a computer storage medium.

The computer storage medium according to the embodiment of the disclosure stores an executable program. When the executable program is executed by a processor, the aforementioned method may be implemented, for example, as shown in at least one of FIG. 2 to FIG. 7.

Figure 10:
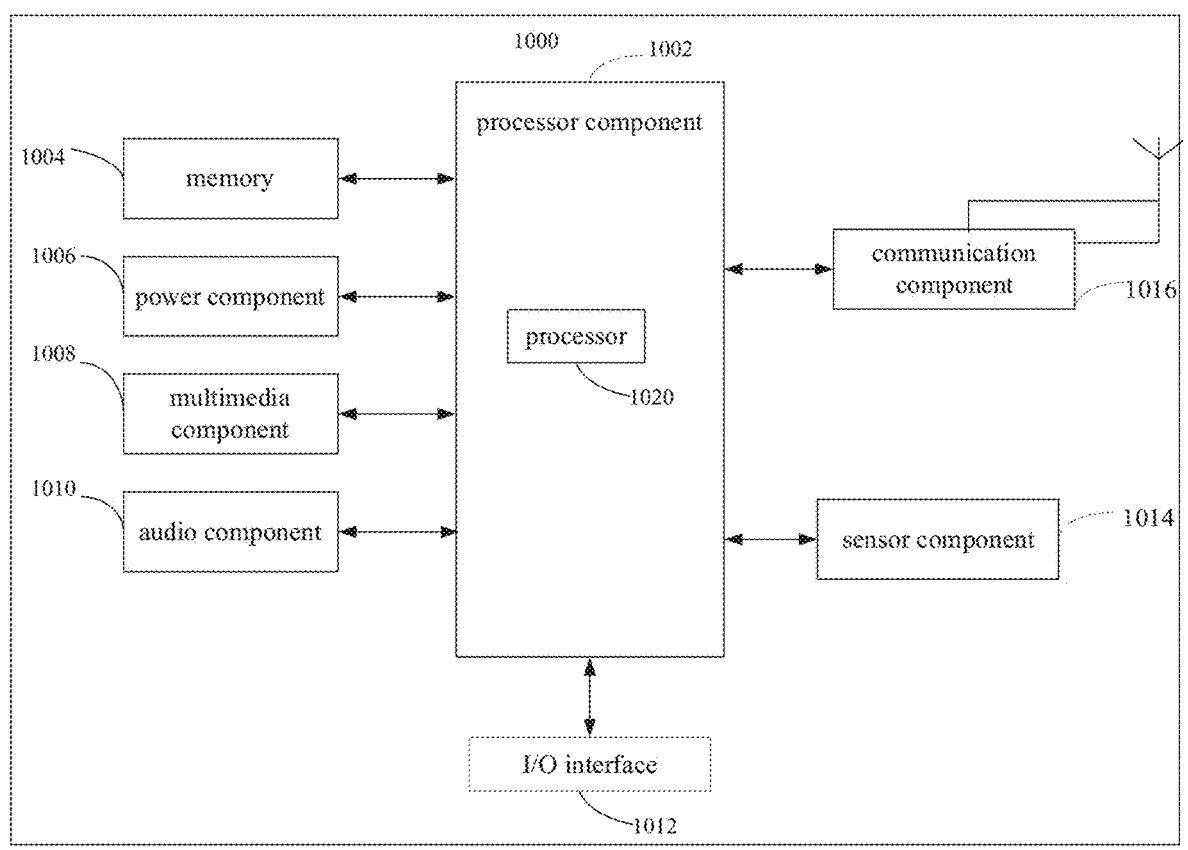
FIG. 10 is a block diagram of a user equipment according to an embodiment of the disclosure.

FIG. 10 is a block diagram of a UE 1000 according to an embodiment of the disclosure. For example, the UE 1000 may be a mobile phone, a computer, a digital broadcast UE, a messaging device, a game console, a tablet device, a medical device, a fitness device, a personal digital assistant, and the like.

Referring to FIG. 10, the UE 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls overall operations of the UE 1000, such as those associated with display, telephone calls, data communications, camera operations, and recording operations.

The processing component 1002 may include one or more processors 1020 to execute instructions to perform all or some of the steps of the methods described above. Moreover, the processing component 1002 may include one or more modules that facilitate interactions between the processing component 1002 and other components. For example, the processing component 1002 may include a multimedia module to facilitate interactions between the multimedia component 1008 and the processing component 1002.

The memory 1004 is configured to store various types of data to support operation of the UE 1000. Examples of such data include instructions for any application or method operating on the UE 1000, contact data, phonebook data, messages, pictures, videos, and the like. The memory 1004 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 1006 provides power to various components of the UE 1000. The power component 1006 may include a power management system, one or more power sources, and any other components associated with the generation, management, and distribution of power in the UE 1000.

The multimedia component 1008 includes a screen providing an output interface between the UE 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1008 includes a front-facing camera and/or a rear-facing camera. When the UE 1000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1010 is configured to output and/or input audio signals. For example, the audio component 1010 includes a microphone (MIC for short) that is configured to receive external audio signals when the UE 1000 is in an operating mode, such as a call mode, a recording mode, and a voice recognition mode. The received audio signal may be further stored in the memory 1004 or transmitted via the communication component 1016. In some embodiments, the audio component 1010 also includes a speaker for outputting audio signals. The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the UE 1000. For instance, the sensor component 1014 may detect an open/closed status of the UE 1000, relative positioning of components, e.g., the display and the keypad, of the UE 1000, a change in position of the UE 1000 or a component of the UE 1000, a presence or absence of user contact with the UE 1000, an orientation or an acceleration/deceleration of the UE 1000, and a change in temperature of the UE 1000. The sensor component 1014 may include a proximity sensor configured to detect the presence of nearby objects without any physical contact. The sensor component 1014 may also include a light sensor, such as a complementary metal oxide semiconductor (CMOS) or a charge-coupled device (CCD) image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the UE 1000 and other devices. The UE 1000 can access a wireless network based on a communication standard, such as WiFi, 2G, or 3G, or their combination. In an embodiment, the communication component 1016 receives a broadcast signal or broadcast associated information from an external broadcast management system via a broadcast channel In an embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In some embodiments, the UE 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method shown in FIG. 2 to FIG. 6.

In some embodiments, there is also provided a non-transitory computer readable storage medium including instructions, such as included in the memory 1004, executable by the processor 1020 in the UE 1000, for performing the above method. For example, the non-transitory computer readable storage medium may be a ROM, a random access memory (RAM), a CD-ROM, a magnetic tape, a floppy disc, an optical data storage device, and the like.

Figure 11:
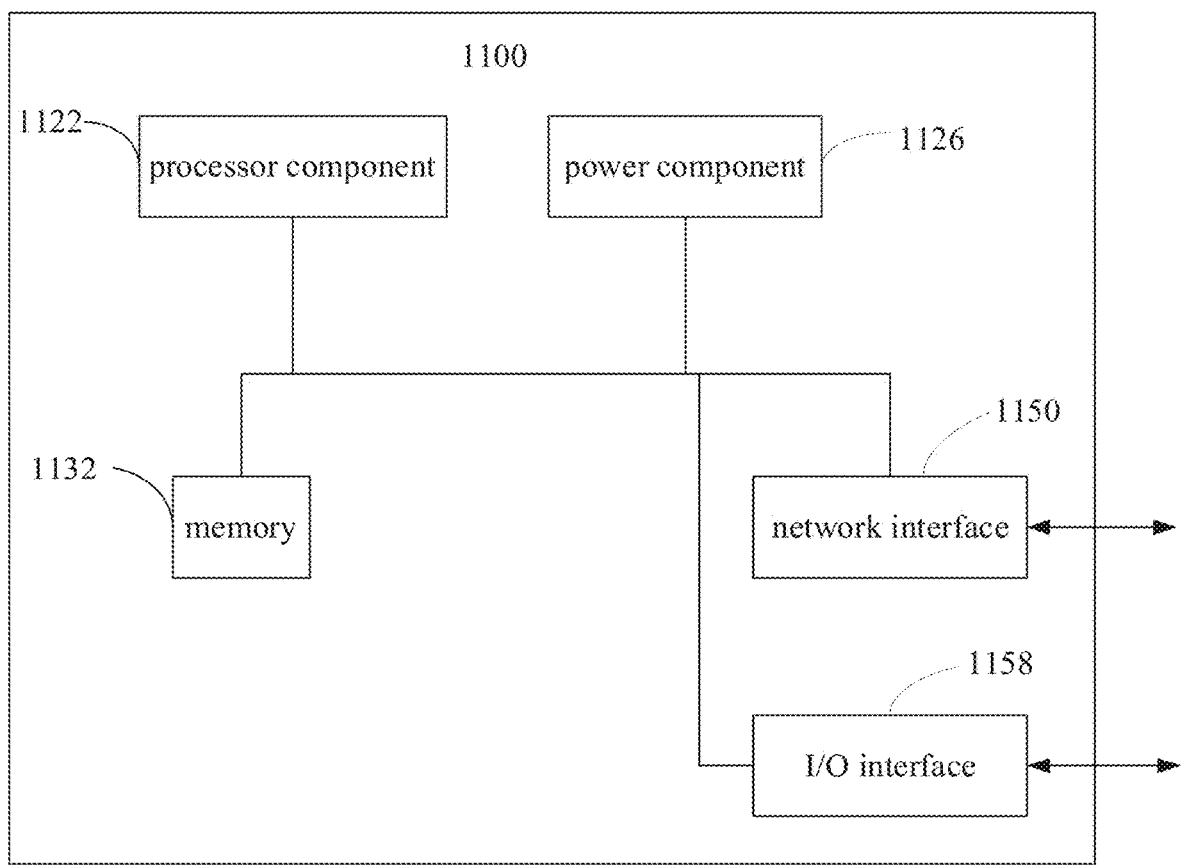
FIG. 11 is a structural diagram of a base station according to an embodiment of the disclosure.

As shown in FIG. 11, it is a structural diagram of a base station according to an embodiment of the disclosure. The base station may be provided as a network device. Referring to FIG. 11, base station 1100 includes a processing component 1122, which further includes at least one processor, and a memory resource represented by a memory 1132 for storing instructions executable by the processing component 1122, such as application programs. The application program stored in the memory 1132 may include one or more modules each corresponding to a set of instructions. In addition, the processing component 1122 is configured to execute the instructions, so as to execute any of the aforementioned methods applied to the base station, for example, the method shown in FIG. 7.

The base station 1100 may also include a power component 1126 configured to perform power management of the base station 1100, a wired or wireless network interface 1150 configured to connect the base station 1100 to a network, and an input-output (I/O) interface 1158. The base station 1100 can operate based on an operating system stored in the memory 1132, such as Windows Server™, Mac OS X™, Unix™, Linux™, FreeBSD™ or the like.

With the method and apparatus for determining a beam, a communication device, and a computer storage medium according to the embodiments of the disclosure, the UE extracts multicast control information from multicast control information transmission resources and determines a beam corresponding to the multicast control information based on an association relationship between multicast control information transmission resources and beams. In this way, the reliability of UE receiving the multicast control information on a plurality of beams may be effectively improved.

Those skilled in the art will be aware of other implementations of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope of the disclosure are indicated in the following claims.

It should be understood that the disclosure is not limited to the precise structures described above and illustrated in the accompanying drawings, and that various modifications and changes may be made without departing from its scope. The scope of the disclosure is limited only by the appended claims.

The invention claimed is:

1. A method for determining a beam, performed by a terminal, the method comprising:
   extracting multicast control information from multicast control information transmission resources;
   obtaining group numbers of the multicast control information transmission resources;
   determining an association relationship between multicast control information transmission resources and beams based on the group numbers of the multicast control information transmission resources; and
   determining a beam corresponding to the multicast control information based on the association relationship between multicast control information transmission resources and beams.

2. The method of claim 1, further comprising:
   obtaining configuration information of the multicast control information transmission resources; and
   determining the association relationship between multicast control information transmission resources and beams based on the configuration information.

3. The method of claim 2, wherein the configuration information is a configuration identifier of a physical downlink control channel (PDCCH).

4. The method of claim 1, wherein the multicast control information transmission resources are grouped in an interlaced or continuous way based on a time order.

5. The method of claim 1, further comprising:
   in response to a plurality of beams corresponding to the multicast control information being determined, determining a target beam from the plurality of beams; and
   obtaining the multicast control information sent by the target beam by monitoring multicast control information transmission resources corresponding to the target beam.

6. The method of claim 5, wherein determining the target beam from the plurality of beams comprises:
   obtaining signal qualities of the plurality of beams; and
   selecting the target beam based on the signal qualities.

7. The method of claim 5, wherein determining the target beam from the plurality of beams comprises:
   obtaining signal qualities of the plurality of beams;
   selecting beams each with a signal quality greater than a quality threshold from the plurality of beams as a plurality of candidate beams; and
   selecting the target beam from the plurality of candidate beams.

8. The method of claim 1, further comprising:
   obtaining spatial information of the beam, wherein the spatial information is configured to receive the multicast control information.

9. The method of claim 8, wherein the spatial information comprises at least one of: Doppler shift information, Doppler spread information, average delay information, delay spread information, or spatial receiver parameter information.

10. The method of claim 1, wherein the multicast control information comprises at least one of multicast control channel (MCCH) information or MCCH change notification.

11. The method of claim 1, wherein the multicast control information transmission resources comprise at least one of: scheduling control signaling transmission resources of the multicast control information, data transmission resources of the multicast control information, or change notification transmission resources of the multicast control information.

12. A method for determining a beam, performed by a network device, the method comprising:
   obtaining multicast control information to be sent;
   obtaining multicast control information transmission resources, and determining a beam carrying the multicast control information transmission resources based on an association relationship between multicast control information transmission resources and beams, wherein the association relationship is determined based on group numbers of the multicast control information transmission resources; and sending the multicast control information transmission resources through the beam, wherein the multicast control information is carried in the multicast control information transmission resources.

13. The method of claim 12, further comprising:
generating configuration information based on the association relationship between the multicast control information transmission resources and beams; and
sending the configuration information through a radio resource control (RRC) signaling.

14. The method of claim 12, wherein the multicast control information transmission resources comprise at least one of: scheduling control signaling transmission resources of the multicast control information, data transmission resources of the multicast control information, or change notification transmission resources of the multicast control information.

15. A terminal, comprising:
a transceiver;
a memory; and
a processor connected to the transceiver and the memory respectively,
wherein the processor is configured to:
extract multicast control information from multicast control information transmission resources;
obtain group numbers of the multicast control information transmission resources;
determine an association relationship between multicast control information transmission resources and beams based on the group numbers of the multicast control information transmission resources; and
determine a beam corresponding to the multicast control information based on the association relationship between multicast control information transmission resources and beams.

16. A network device, comprising:
a transceiver;
a memory; and
a processor connected to the transceiver and the memory respectively,
wherein the processor is configured to perform the method of claim 12.

* * * * *